(12) United States Patent
Kaja et al.

(10) Patent No.: US 12,301,525 B2
(45) Date of Patent: May 13, 2025

(54) SYSTEM AND METHOD FOR MULTI-PARTY CO-BROWSING FOR END-TO-END COLLABORATION IN ASSISTED CHANNELS

(71) Applicant: VERIZON PATENT AND LICENSING INC., Basking Ridge, NJ (US)

(72) Inventors: Hussair Kaja, Irving, TX (US); Anand Ashok Mirji, Edison, NJ (US); Aaron Bittig, Alpharetta, GA (US); Michael Hawkins, Milton, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 48 days.

(21) Appl. No.: 18/322,804

(22) Filed: May 24, 2023

(65) Prior Publication Data

US 2024/0396855 A1 Nov. 28, 2024

(51) Int. Cl.
*G06F 15/16* (2006.01)
*H04L 51/02* (2022.01)
*H04L 51/046* (2022.01)
*H04L 67/141* (2022.01)

(52) U.S. Cl.
CPC ............ *H04L 51/046* (2013.01); *H04L 51/02* (2013.01); *H04L 67/141* (2013.01)

(58) Field of Classification Search
CPC ...... H04L 51/046; H04L 51/02; H04L 67/141
USPC .................................. 709/206–207, 227–228
See application file for complete search history.

(56) References Cited

U.S. PATENT DOCUMENTS

| | | | | |
|---|---|---|---|---|
| 8,051,178 B2* | 11/2011 | Skidgel | ................. | G06F 16/954 709/227 |
| 10,764,439 B1* | 9/2020 | Negi | ..................... | H04L 67/141 |
| 2010/0257451 A1* | 10/2010 | Halevi | .................... | H04L 67/02 709/206 |
| 2011/0173280 A1* | 7/2011 | Ishikawa | ............... | H04L 51/043 709/206 |
| 2013/0046815 A1* | 2/2013 | Thomas | .................. | H04L 67/02 709/203 |
| 2017/0090853 A1* | 3/2017 | Khalatian | ............... | G06F 9/542 |
| 2017/0205979 A1* | 7/2017 | Badge | ..................... | H04L 67/14 |

* cited by examiner

*Primary Examiner* — Bharat Barot

(57) ABSTRACT

In some aspects, the techniques described herein relate to a method including: initiating a communication session between a user and an agent; generating an application link for the communication session, the application link associated with a co-browsing application; transmitting the application link to a client device associated with the user; receiving data from the client device via the co-browsing application executed in response to the application link and associating the data with the communication session; pre-populating a co-browsing session using the data; and synchronizing a display of pages between an agent emulator and the co-browsing application, wherein synchronizing includes rendering a given page on both the agent emulator and the co-browsing application and displaying an input received via the co-browsing application in the agent emulator.

20 Claims, 10 Drawing Sheets

SYSTEM AND METHOD FOR MULTI-PARTY CO-BROWSING FOR END-TO-END COLLABORATION IN ASSISTED CHANNELS

BACKGROUND INFORMATION

Current communications platforms between users generally rely on in-person communication to establish details prior to service. For example, users often call service centers and manually provide details to agents or pre-screening automated systems.

DETAILED DESCRIPTION OF EXAMPLE EMBODIMENTS

Figure 1:
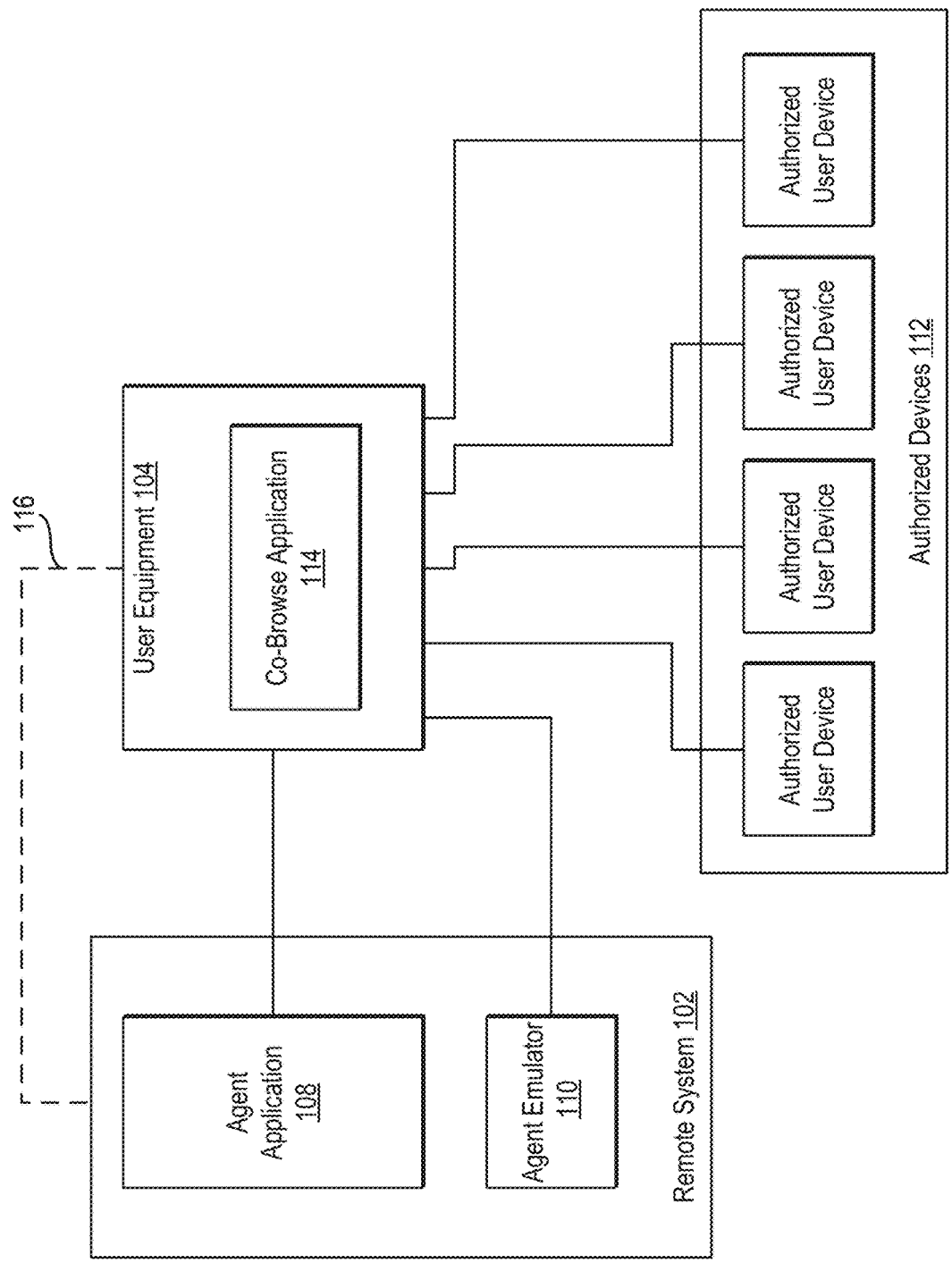
FIG. 1 is a block diagram illustrating a system for providing multi-party co-browsing for end-to-end collaboration in assisted channels.

In current communications systems, users can frequently be placed on "holds" or other queues until another party is ready to communicate with the users. One non-limiting example of this scenario is a customer calling an organization via an interactive voice response (IVR) system and waiting until a representative is available to speak. This hold or wait time can be significant, and during this period, communications are completely paused. Then, only when both parties are ready can the parties begin communicating.

The disclosed embodiments provide a system that re-purposes this idle time that occurs in current communications systems. The disclosed embodiments both ensure that users stay engaged during hold times but also provide a mechanism for collecting data needed for later communications, data that would be collected in current systems at the start of communications and after a hold period. Further, as discussed below, the disclosed embodiments provide a co-browsing session that allows for a shared browsing process whereby both a customer and an agent may view the same screens to complete an operation or other requested service. In this manner, customers can be aware of the actions taken by a representative before completing a communications session.

In brief, the disclosed embodiments utilize a "co-browsing" session that can be initiated by the user and then joined by another party (e.g., an organization's representative). In some implementations, a computing system can transmit a link to the co-browsing session to the user when the user initiates communications (e.g., via an IVR session). In some implementations, the computing system can detect or receive an estimated wait time and can trigger sending the link if the estimated wait time is above a preconfigured wait time threshold. In some implementations, the computing system may send the link via short message service (SMS), email, or other suitable communications protocol. In some implementations, the computing system can simultaneously alert the user that it sent the link.

The user may launch an application in response to the link. Although an application is discussed, the application can alternatively be implemented as a web page or similar technology. In some implementations, the application can be tailored based on the intent of the communications. For example, during an IVR session, the user may describe their intent (either via voice command or via touchtone input). This intent can then be mapped to a configuration of the application. Once launched, the application can prompt the user for necessary information. For example, if the user is calling to place an order, the user can browse for the desired products and "add" the desired products to a cart. As another example, if the user is calling about mobile phone upgrades, the user may provide their account details, mobile device identifier, or similar information.

After the idle/hold time expires, the user will be connected to an agent or other party. Although the terms "user" and "agent" are used for convenience, the disclosure applies to any type of multi-party communications, and the specific roles of parties are not limiting. Once the user and agent are connected, data collected by the application may be presented to the agent, thus alleviating the need for the user to use communications time to provide "background" information to the agent. In some implementations, the computing system can provide this data to the agent via an agent application (or equivalent web page, as discussed). In some implementations, the agent can then use the agent application to assist the user. For example, the agent application can allow the agent to complete a purchase for the user, upgrade mobile service, or perform any similar type of function to assist the user. During this stage, the agent application and the application seen by the user (referred to now as the "user application") can be synchronized. For example, the user application may request a signature, and the agent application may display the signature of the user while it is being entered via the user application. In some scenarios, the agent may see the same data displayed in the user application. However, in other scenarios, masking may be used to shield protected information (e.g., social security numbers, credit card numbers, etc.). In some implementations, the displays of the agent application and user application may be identical, while in others, the data may be the same, but the presentation may vary. In any scenario, the cooperative accessing of the applications is referred to as "co-browsing" since both the agent and the user are accessing the same content at the same time. The user application may allow the user to end the communications (e.g., by confirming an order), which will end the communication session between the user and the agent.

In contrast to existing systems, the disclosed embodiments leverage hold times in existing communications systems to improve customer engagement, satisfaction, and loyalty. By collecting data during hold times, the disclosed embodiments improve the average handling time (AHT) of a given communications system and reduce the total time of all parties participating in the system. Further, the disclosed embodiments reduce the drop-off rate of communications and secure information that is currently provided insecurely (e.g., credit card numbers). Finally, the disclosed embodiments reduce the number of communications (e.g., SMS, email, etc.) by utilizing a dedicated co-browsing application versus requiring separate communications for various steps of a communication session.

In some aspects, the techniques described herein relate to methods for facilitating hold-time communications between users and agents. The method can include initiating a communication session between a user and an agent and generating an application link for the communication session. The method can then include transmitting the application link to a client device associated with the user. During the execution of the co-browsing application, the method can include receiving data from the client device and associating the data with the communication session. Once the user is no longer on hold, the method can include pre-populating a co-browsing session using the data and then synchronizing a display of pages between an agent emulator and the co-browsing application. In some scenarios, this synchronizing can include rendering a given page on both the agent emulator and the co-browsing application and displaying an input received via the co-browsing application in the agent emulator.

In some aspects, the communication session can be initiated via an interactive voice response (IVR) system. In some aspects, the method can include customizing the application link based on one of a profile of the user or a determined intent of the communication session. In some aspects, the method can include determining that an estimated hold time of the communication session exceeds a preconfigured threshold and transmitting the application link in response to the hold time of the communication session exceeding a preconfigured threshold.

In some aspects, the method can include displaying a page in both the co-browsing application and the agent emulator; then, the method can include detecting, by the co-browsing application, user input to the given page and updating the given page on the agent emulator based on the user input. During this process, the method can include replacing a portion of the user input with shielded data prior to transmitting the user input to the agent emulator. Further, in some scenarios, this process can include receiving a page change event from the co-browsing application and displaying a second given page in the agent emulator responsive to the page change event.

The foregoing methods (described in detail herein) can further be stored in a non-transitory computer-readable storage medium for tangibly storing computer program instructions capable of being executed by a computer processor and can likewise be executed by a processor of a computing device.

FIG. 1 is a block diagram illustrating a system for providing multi-party co-browsing for end-to-end collaboration in assisted channels.

The system includes a remote system 102, UE 104, and authorized devices 112. The remote system 102 may be a network of computing devices that includes an agent application 108 and an agent emulator. Specific details on computing devices that may be used in the system are described more fully in FIG. 9, and those details are not repeated herein.

In general, remote system 102 can comprise a system operated by an organization or other entity. Such organizations may employ customer service agents or other individuals that provide support for customers, such as the user operating the user equipment (UE) 104. As will be discussed in more detail, customers may contact the organization via various means (represented as path 116), such as via IVR systems, chatbots, etc. These communications may be buffered to held until an agent is available. During that hold period, an application link can be transmitted to the UE 104, which enables the UE 104 to launch a co-browsing application 114. The co-browsing application 114 may comprise a native or mobile application, web page, or another type of graphical user interface (GUI). During the hold period, the co-browsing application 114 can display various pages and communicate with the remote system 102 to pre-populate data relevant to the communication session. No limit is placed on the type of data, but examples may include device details, support issues, e-commerce purchases, etc.

The remote system 102 can store these pre-populated details in a message queue (e.g., temporary storage) (not illustrated) and associate them with the UE 104 and the active communication session. Once the hold time expires and an agent is available to speak or otherwise communicate with the user, the co-browsing application 114 can be communicatively coupled to an agent application 108 and an agent emulator 110. In some implementations, the co-browsing application 114 can be connected to the agent application 108 via intermediary devices in the remote system 102. In some implementations, the connections between the co-browsing application 114 and the agent application 108, and agent emulator 110 can be implemented via message queues to enable rapid communication between the devices.

In general, the agent application 108 and the agent emulator 110 may comprise software applications accessible by an agent. In some implementations, the agent emulator 110 may comprise a component of the agent application 108, while in other implementations, they may be stand-alone applications. Agent application 108 may be responsible for managing the objective of the communication session and may comprise any type of customer service application that allows agents to complete tasks on behalf of customers. The agent emulator 110 may comprise a lightweight page rendering application that can be synchronized with the co-browsing application 114. Specifically, the co-browsing application 114 may provide a workflow of pages for the user to review and enter data. In some implementations, remote system 102 may utilize a system for managing page content that is shared between co-browsing application 114 and agent emulator 110. For example, a content or experience management system can be used to manage canonical pages for presentation to both co-browsing application 114 and agent emulator 110. As the user navigates these pages, the agent emulator 110 can display the same page. Further, when the user interacts or inputs data into a page, the agent emulator 110 can receive this data (or a shield version thereof) and render the same data, thus providing a collaborative browsing experience. Once the session is completed, the co-browsing application 114 may terminate the session and transmit all the collected data to the agent application 108 for final processing (e.g., order fulfillment).

The system may also include authorized devices 112. In some implementations, the authorized devices 112 can comprise computing devices associated with a user of UE 104 and authorized to view account-level details. For example, authorized devices 112 may comprise family members participating in a shared cellular plan. In some implementations, each of the authorized devices 112 includes its own co-browsing application that implements an emulator similar to agent emulator 110. As with agent emulator 110, each authorized device emulator can also receive events related to page changes and input data and can render this data in a similar manner. Further, each of the authorized devices 112 can be connected out-of-band to the communication session to listen and optionally participate in the session. Specifically, each of the authorized devices 112 may connect independently to the communications session via their own voice or data sessions with the IVR in addition to being communicatively coupled to the UE 104 via one or more message queues (as discussed herein). Thus, as an example, the user of UE 104 may comprise the primary account holder of a cellular plan attempting to upgrade a phone, and one of the authorized devices 112 may comprise a family member assisting the primary account holder while monitoring the primary account holder's progress through the workflow.

In some implementations, UE 104 may be communicatively coupled to remote system 102 via a content delivery network (CDN). In some implementations, this CDN can be a self-organizing CDN. In some implementations, the CDN can forward user traffic from UE 104 to remote system 102 via a proxy server. In some implementations, this proxy server can implement identity management functions as well as expose API endpoints to the UE 104. Further, in some implementations, this proxy may be accessible by the agent application and receive data from agents (e.g., agent application 108) as well as UE 104. In some implementations, remote system 102 may be implemented as one or more microservices implementing the functions described in further detail herein. In some implementations, the microservices may raise and maintain message queues (as described) that UE 104 and other authorized devices are subscribed to.

The above operations of remote system 102, UE 104, and authorized devices 112 are described more fully herein with respect to the following flow diagrams, and the details described herein are incorporated in the description of FIG. 1 in their entirety.

Figure 2:
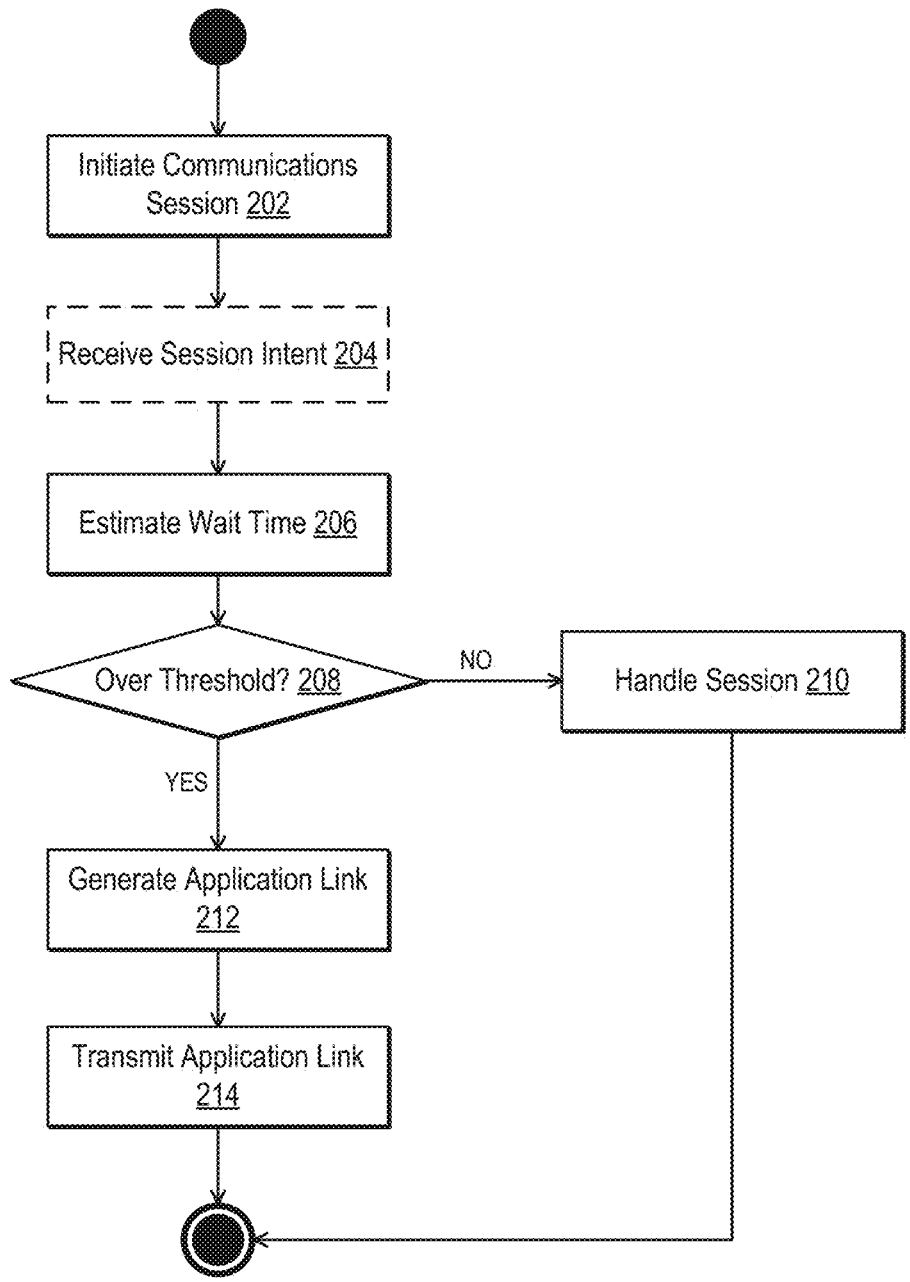
FIG. 2 is a flow diagram illustrating a method for generating and transmitting a co-browsing application link during a hold period.

FIG. 2 is a flow diagram illustrating a method for generating and transmitting a co-browsing application link during a hold period.

In step 202, the method can include initiating a communication session.

In this step, a user initiates a communication session with an agent. In some implementations, the agent may be part of an organization or another entity. The communication session may be initiated in various ways, including the user dialing a designated phone number associated with the organization or service provider, which connects them to an interactive voice response (IVR) system or an automated call distribution (ACD) system. As another example, the user can visit the organization's website or mobile application and start a chat session with a chatbot or live agent. As another example, the user can send an email or text message to the organization's support email address or phone number, which would automatically initiate a communication session. As yet another example, the user can open a dedicated mobile app provided by the organization and start a communication session from within the app.

In step 204, the method can optionally include receiving the intent of the communication session.

In general, the intent refers to the user's purpose in initiating the communication session and is not limiting. For example, a user may contact an organization to purchase items, receive technical support, and reach other objectives. In some implementations, the system handling the initial communications can obtain this intent via programmatic means. For example, an IVR system or chatbot can request the user express their intent (either verbally, via text, or via touchtone options). The system can then store this explicit intent in a data structure associated with the active communication session.

Other techniques are possible. For example, the system can infer the intent based on the context of the session. In some scenarios, the system may provide dedicated links for certain types of intents. For example, one phone number of an IVR system can be used for technical support while another can be provided for commercial calls. In this manner, even without explicit user intent, the system can roughly estimate the intent of the communication session. As another example, a user profile or other history can be used to infer intent. For example, if a given user only calls for technical support and has never made a purchase, the system can infer that the intent is for technical support. Further, the system could predict the intent based on a user's history. If a user is due for an upgrade for a mobile phone, the system can infer that the user may be calling to move forward with such an upgrade.

Once the intent is received, it can be mapped to a specific configuration of the co-browsing application (as will be discussed) that is relevant to the user's needs. This can involve loading specific modules or interfaces, pre-filling forms with known customer data, or providing a customized workflow for the user to follow. This step helps create a more personalized experience for the user and streamlines the data collection process during the hold time.

In step 206, the method can include estimating a wait time before a user will be connected to an agent.

In some systems, multiple clients may attempt to communicate with agents. Due to the limited number of agents, these clients can be queued on a first-come-first-serve basis (or another basis) for access to one or more agents. In some implementations, the system can monitor the number of agents who are currently available to take calls or chat sessions and estimate the wait time accordingly. In some implementations, the system can analyze the existing queue of callers or chat sessions waiting to be connected to an agent and determine an approximate wait time based on the average handling time (AHT) for similar issues (e.g., based on the user intent). Alternatively, or in conjunction with the foregoing, the system can analyze historical data and patterns of call or chat volumes to predict the expected wait time during specific periods. Further, in some implementations, the method can include tracking ongoing communication sessions and their durations and adjusting the wait time estimation accordingly as agents become available or occupied. Finally, in some implementations, the method can profile individual agents and adjust wait times based on the call volume and associated agents.

In step 208, the method can include determining if the estimated wait time is over the threshold. If not, the method can include handling the session normally in step 210.

In this step, the system compares the estimated wait time calculated in step 206 to a preconfigured threshold value. The threshold value can be set by the organization based on various factors, which may be used alone or in combination. One such factor can include average wait times, which represent the average wait times typically experienced by users, ensuring that co-browsing is activated only when the user is expected to wait longer than usual. As another example, specific service level agreements (SLAs) for users or their organizations can establish a target wait time as part of their SLAs, and the threshold can be set accordingly to help meet those targets. In some implementations, user preferences regarding acceptable wait times can be collected and used to adjust the threshold based on the preferences. As another example, resource availability can be used to adjust the preconfigured threshold such that the threshold can be set dynamically based on the availability of agents or other resources, ensuring that co-browsing is activated only when necessary to optimize resource utilization.

If the estimated wait time is below the threshold, the method proceeds to step 210, where the communication session is handled using the normal process without initiating a co-browsing session. In some implementations, this could involve keeping the user on hold until an agent becomes available or using other techniques to address the user's query, such as automated chatbots or self-service options.

If, however, the estimated wait time exceeds a threshold, the method proceeds to step 212, where it can include generating an application link.

In general, the application link can comprise any type of linking mechanism that allows a client device to load a mobile application, web application, desktop application, or another interactive user interface. Examples of links can include uniform resource identifiers (URIs), uniform resource locators (URLs), uniform resource names (URNs), and similar links. As a first example, the link may comprise a URL of a web application. As a second example, the link may comprise a URI to a mobile application (e.g., a deep mobile link).

In any scenario, the application link can be customized for the user and the communication session. For example, the method can include generating a unique session identifier for the link, which uniquely associates the link with the communication session. In some implementations, the called application or web page can use this data to pre-fill forms or personalize a co-browsing experience for the user. In some implementations, the method can also set an expiration time for the link to ensure that it cannot be reused after a certain period or after the co-browsing session has ended. In some implementations, the system can explicitly expire the link upon the hold time expiring and the user being connected to an agent.

In step 214, after generating the application link, the method can include transmitting the application link to a client device of the user.

In some implementations, the method can send the application link as a short message service (SMS) message to a phone number associated with the user. In some implementations, this number can be the number used to initiate the communication session in step 202. However, the disclosure is not limited as such. For example, the user may provide account details in step 202, and the method can include identifying one or more mobile numbers to send the application link to. In some implementations, the method can send the application link to only the user initiating the session while in other implementations, the method can include sending the application link to other authorized numbers (as discussed in FIG. 1).

Although SMS is described primarily, other delivery mechanisms can be used. For example, email or in-application notifications can be used to transmit an application link in a similar manner. As another example, if the user is interacting via a text-based system (e.g., chatbot), the application link can be provided in the text display directly. As another example, an IVR system can be configured to provide the application link through an audio message, allowing the user to manually enter the link.

Figure 3:
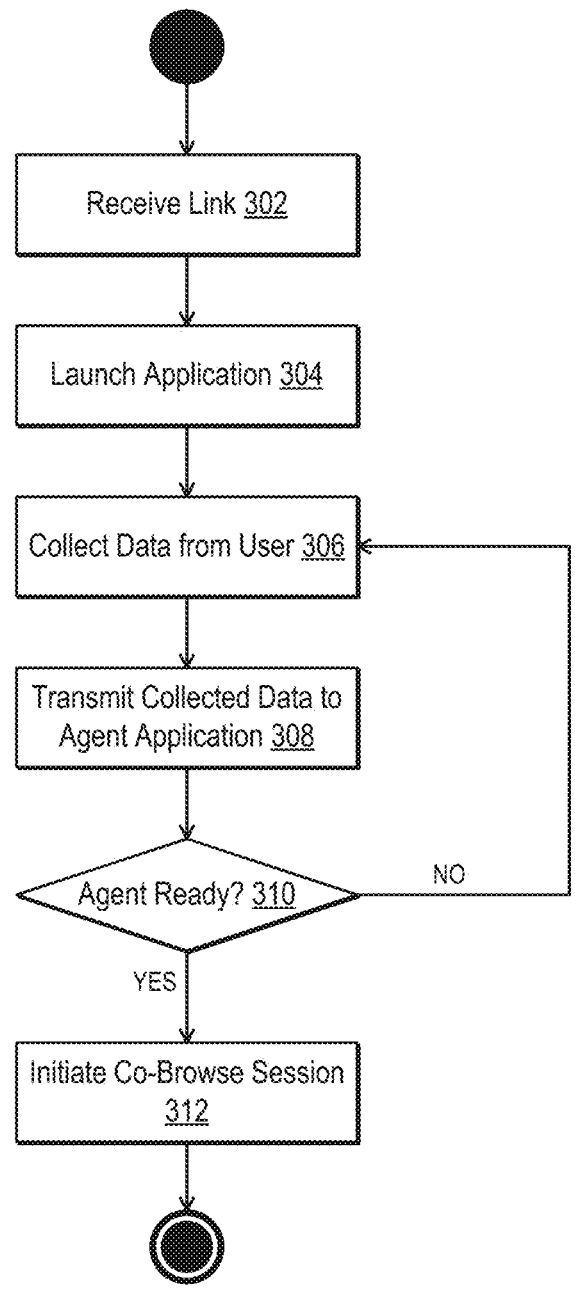
FIG. 3 is a flow diagram illustrating a method for initiating a co-browsing session by a client device.

FIG. 3 is a flow diagram illustrating a method for initiating a co-browsing session by a client device. In some implementations, the method of FIG. 3 may be executed on a client device associated with a user initiating the communication session in FIG. 2.

In step 302, the method can include receiving the application link transmitted in step 214 of FIG. 2.

Depending on the method used to send the link (e.g., SMS, email, in-app notification, chat session, or IVR), the client device processes the incoming message and makes the link available to the user via a corresponding receiving application (e.g., messages application, email client, etc.).

In step 304, the method can include launching an application in response to receiving the application link.

In some implementations, the user operating the client device can click or tap on the received link to launch the co-browsing application. In a first implementation, the co-browsing application may be a web-based application. In this scenario, the application link may comprise a URL and the client device can open the link in a web browser, automatically loading the co-browsing interface. In a second implementation, the co-browsing application can comprise a native application. In this scenario, the application link can trigger the installation or launch of the app from an app store or launch the app if it's already installed on the client device. In some cases, the link may be a deep link that opens the app directly to the relevant co-browsing interface.

As the co-browsing application launches, it may automatically load personalized content based on the user's intent (discussed above) and any available user-specific data. This can include pre-filled forms, tailored interfaces, or targeted workflows that align with the user's needs. In some implementations, the co-browsing application can navigate directly to a relevant page or can filter the available options to only display those relevant to the user's communication session. For example, if the user is calling for technical support, the displayed page can request details of the user's device, their problems, or other relevant data. By contrast, if the user's intent is to make a purchase, the co-browsing application may navigate to a storefront or other interface to allow for adding items to a virtual cart.

Further, during launch, the co-browsing application can establish a connection with the organization's backend system, allowing real-time data exchange and ensuring that the information provided by the user is securely transmitted and synchronized with the agent's application, as will be discussed further herein. In some implementations, this connection can comprise a message queue or similar type of network transmission mechanism between the co-browsing application and the backend system.

In step 306, the method can include collecting data from the user. In this step, the co-browsing application collects information from the user, which will later be used during the conversation with the agent as well as during the synchronized co-browsing session with the agent emulator.

In some implementations, the co-browsing application can present various forms or fields to the user to collect information relevant to the communication session. For example, the forms can collect the user's device serial number, contact information, or similar type of information. Alternatively, or in conjunction with the foregoing, the method can provide a storefront or other type of e-commerce site that allows a user to select items for purchase while they wait for the hold time to end. In another implementation, the co-browsing application can provide interactive workflows that can guide the user through a series of interactive steps, such as selecting products, choosing service options, or configuring settings based on their needs. Alternatively, or in conjunction with the foregoing, the user can upload supporting documents, images, or other files directly through the co-browsing application. In some implementations, as the user enters information, the co-browsing application can perform real-time validation checks, such as verifying the format of email addresses or checking the availability of usernames or validating device identifiers or serial numbers. In some implementations, the co-browsing application can also provide static information (e.g., end-user license agreements, privacy policies) and can obtain user consent to such static information (e.g., via signatures and/or acceptance of policies).

In step 308, the method can include transmitting the collected data to an agent application.

In some implementations, the co-browsing application can transmit any data collected in step 306 back to the backend system associated with the agent. In some implementations, the co-browsing application can transmit this data using a message queue or a similar type of transport mechanism. In some implementations, the backend system can record the data along with the communication session for later use by the agent via the agent application.

In step 310, the method can include determining if the agent is ready or, in other terms, if the hold time (as discussed above) has expired. If not, the method can return to step 306 where more data and be collected until the hold time expires and the agent is ready. In some implementations, the user may or may not opt to input more data during this loop. In these steps (step 306 through step 310), the user can navigate through multiple portions of the co-browsing application and incrementally update the communication session with collected data. In this manner, the user can pre-populate the communication session with relevant data, thus making use of the hold time. Since all of the data is stored by the backend system and associated with the communication session, when the hold time expires, the agent application can be pre-populated with all of the collected data, decreasing the AHT of the session.

Once the agent is ready (i.e., the hold time expires), the method can include initiating a co-browsing session in step 312. In some implementations, step 312 can include establishing a connection with an agent emulator. In some implementations, the agent emulator and the co-browsing application can be communicatively connected via a message queue or similar type of connection that allows for rapid message passing between the two devices. In some implementations, this connection can be separate from a connection with the agent application and backend system. As will be discussed, this connection between the emulator and the co-browsing application can enable synchronized browsing between the two entities.

In some implementations, step 312 can also include the client device establishing connections to one or more additional message queues or similar transport mechanisms. As will be discussed, data transmitted to the agent emulator via its own queue can be replicated and pushed to these additional queues. In some implementations, these additional queues can be connected to authorized client devices, thus allowing an authorized client device to participate in the co-browsing session. In some implementations, the authorized client device can operate similar to the agent emulator in that they can display what is being displayed on the user's client device and the discussion of the operations of authorized client devices are not repeated herein with respect to authorized client devices. In some implementations, as part of initiating a co-browsing session, the co-browsing session can be pre-populated with the data received while the user is holding. Specifically, the method can pre-populate the co-browsing session by displaying the pre-populated data in an agent application associated with the agent emulator.

Figure 4:
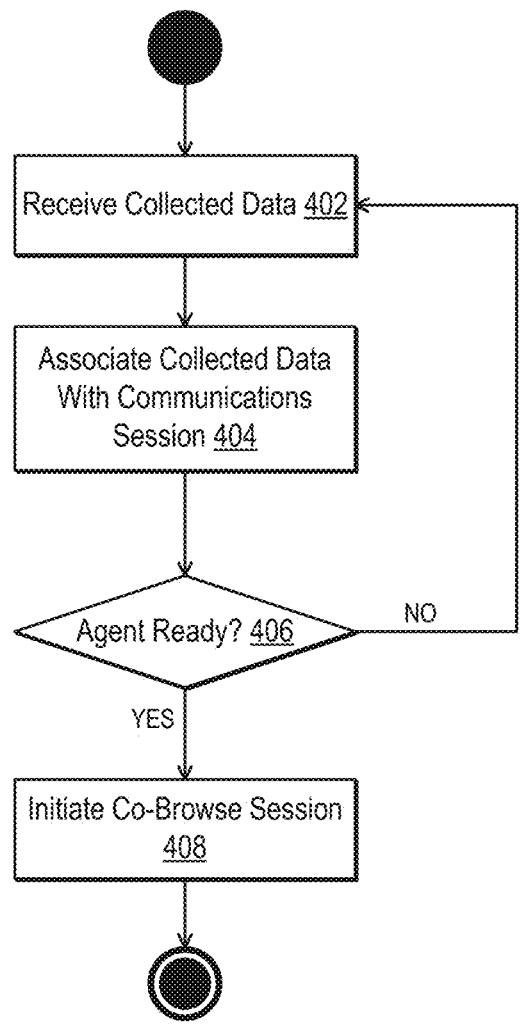
FIG. 4 is a flow diagram illustrating a method for initiating a co-browsing session by an agent device.

FIG. 4 is a flow diagram illustrating a method for initiating a co-browsing session by an agent device. In some implementations, the method of FIG. 4 may be executed on an agent device (via a backend system and agent application) associated the communication session initiated in FIG. 2.

In step 402, the method can include receiving data collected via a co-browsing application, such as that collected in step 306 of FIG. 3. As discussed, the co-browsing application can periodically transmit collected data from the client device to the backend system via, for example, a message queue or similar transport mechanism. The backend system can be configured to receive this data and process and store the data.

In step 404, the method can include associating the collected data with an active communication session. In some implementations, the backend system can maintain a record of established message queues or similar transport mechanisms. Based on the underlying queue, the backend system can identify a communication session (using, for example, a session identifier) and associate the collected data with the session. In some implementations, the collected data can be stored in a temporary storage area such as a key-value store or similar type of storage mechanism. Other types of storage mechanisms can also be used. In some implementations, step 402 and step 404 can operate quickly to persistently store session-relate data prior to an agent being available.

In step 406, the method can include determining if the agent assigned to the communication session (or the next available agent) is ready. If not, the method continues to collect data from the co-browsing application in step 402. If the agent is ready, the method proceeds to step 408. Thus, as illustrated, a separate data collection process can execute on the backend system to populate a database of session-related data while the user waits for an agent. Unlike existing approaches, the use of a co-browsing application can greatly increase the type of data collected during such a session including full product cart listings.

In step 408, the method can include initiating a co-browsing session. In some implementations, step 312 can include establishing a connection with an agent emulator. In some implementations, the agent emulator and the co-browsing application can be communicatively connected via a message queue or similar type of connection that allows for rapid message passing between the two devices. In some implementations, this connection can be separate from a connection with the agent application and backend system. As will be discussed, this connection between the emulator and the co-browsing application can enable synchronized browsing between the two entities. In some implementations, as part of initiating a co-browsing session, the co-browsing session can be pre-populated with the data received while the user is holding. Specifically, the method can pre-populate the co-browsing session by displaying the pre-populated data in an agent application associated with the agent emulator.

Figure 5:
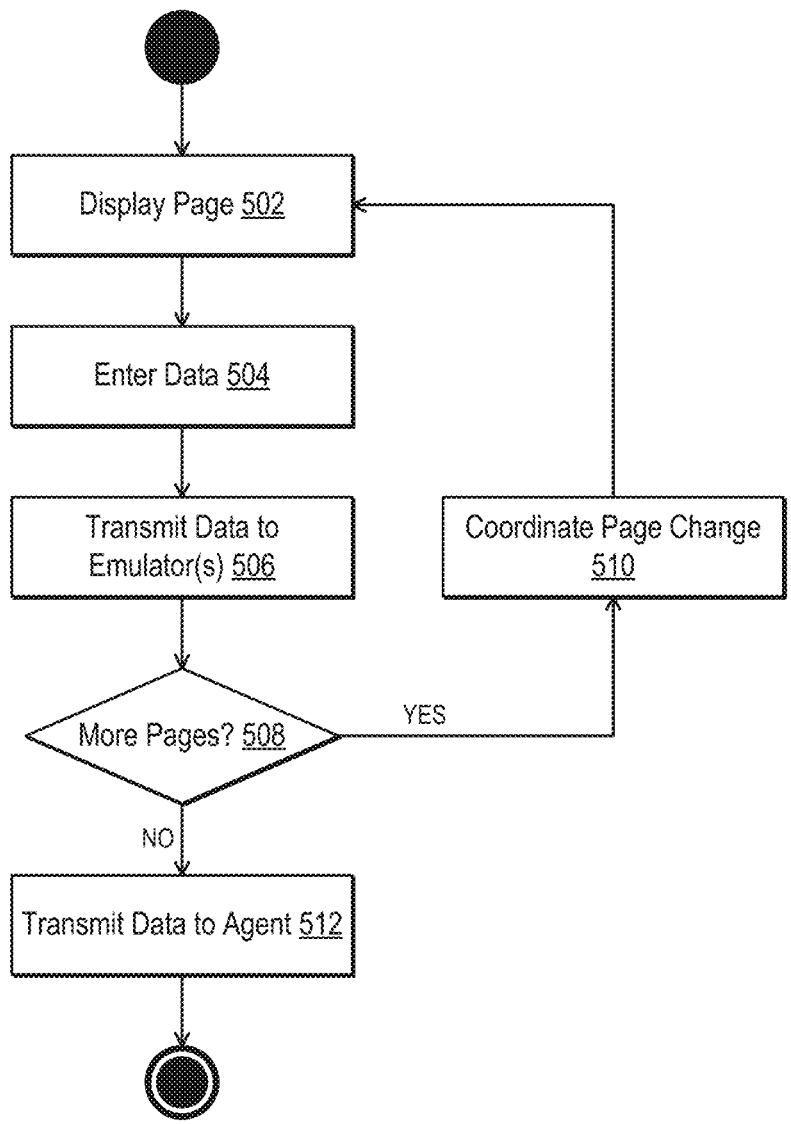
FIG. 5 is a flow diagram illustrating a method for synchronizing co-browsing at a client device.

FIG. 5 is a flow diagram illustrating a method for synchronizing co-browsing at a client device. In some implementations, the method of FIG. 5 may be executed on a client device associated with a user initiating the communication session in FIG. 2.

In step 502, the method can include displaying a page.

In some implementations, the page can comprise a web page or a page of a mobile or native application. In some implementations, the page can include static content. Alternatively, or in conjunction with the foregoing, the page can include interactive content such as hyperlinks, form fields, signature inputs, or any other type of control that can receive user input or data. In some implementations, the page can be structured as a document object model (DOM) or similar type of structured representation of the page. In some implementations, the first page displayed by the co-browsing application can be selected based on the user intent, based on a page selected by the agent, or based on the user's progress through a series of pages. The specific content of the page is not limiting.

As will be discussed in FIG. 6, the agent emulator can display the same content of the page at the agent's location. In some implementations, both the agent emulator and the co-browsing application can receive or maintain the same DOM of any given page. In this manner, the method does not require the transmittal of images of a screen, as is done in many screen-sharing applications. Instead, each device can independently render the DOM of a page. This provides benefits in that while the devices have access to the same DOM, the respective devices can determine how best to render the DOM (as illustrated in the differences between FIG. 7 and FIGS. 8A and 8B). For example, most agent emulators may be executed on desktop devices while the corresponding co-browsing applications may be executed on mobile devices. As such, the use of a DOM representation allows for adjusting the page display to best match the device's capabilities.

In step 504, the method can include entering data at the co-browsing application. In some implementations, entering data can include filling out form fields or selecting hyperlinks displayed on a given page. For example, the DOM can include a form element with one or more input elements for entering data. As another example, the DOM can comprise a storefront with product images and hyperlinks for "adding" those products to a cart. In some implementations, the co-browsing application can utilize event handlers to detect the entering of data. For example, form field changes, form submissions, and hyperlink clicks, can all be captured via event handlers. These event handlers can generate event data structures defining user interactions to record how a user is interacting with the page (e.g., DOM).

In step 506, the method can include transmitting these data structures to one or more emulators.

In some implementations, the event handlers can push the data structures to one or more message queues or similar transport mechanisms. As discussed, at least one of these messages queues is connected to an agent emulator. However, the disclosure is not limited to a single queue and in some implementations, the co-browsing application may push a single event data structure to multiple queues. For example, authorized users of a user's account may be connected to these queues and may execute their own emulators. In some implementations, the co-browsing application can include an emulator view, thus allowing all user devices to be equipped with the co-browsing application while a single user enters data and the other users' co-browsing applications are configured in emulator mode.

Figure 7:
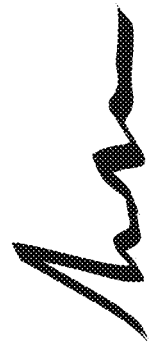
FIG. 7 is a user interface diagram illustrating a co-browsing application of a client device.

As an example, a given page can present a list of agreements to review and sign (e.g., page 704 of FIG. 7). In this example, the co-browsing application may monitor for any user interaction and update a "form state" event which records the state of the form. As the user selects the first checkbox, an event data structure in an exemplary JSON format such as the following may be transmitted to the emulator(s):

```
{
  "form_state": {
    "agreements": [
      { name: "subscriber", "accepted": true },
      { name: "privacy", "accepted": false },
    ],
    "signature": null
  }
}
```

Then, as the user accepts the next agreement, the form state can be updated and transmitted:

```
{
  "form_state": {
    "agreements": [
      { name: "subscriber", "accepted": true },
      { name: "privacy", "accepted": true },
    ],
    "signature": null
  }
}
```

Finally, after the user signs the agreement, the form state can be updated again

```
{
  "form_state": {
    "agreements": [
      { name: "subscriber", "accepted": true },
      { name: "privacy", "accepted": true },
    ],
    "signature": <<blob>>
  }
}
```

Here, "<<blob>>" may represent a text-encoded version of the signature image.

In some implementations, the co-browsing application may include multiple connections. In some implementations, the co-browsing application may protect information based on the connection. For example, page 702 illustrates the input of a credit card number. In some implementations, the co-browsing application may protect this number depending on the channel. Certainly, the co-browsing application may transmit the number in plaintext using a message queue connected to the agent application and backend system since these systems may not be easily accessible. However, when sending the same data to the agent emulator or authorized user emulators, the co-browsing application may replace the credit card number with shielded values (e.g., "X" values). In this manner, the emulators can simulate the entry without having access to sensitive data (e.g., credit card numbers, social security numbers, etc.).

The foregoing examples are not intended to be limiting. For example, the rate in which the co-browsing application transmits data can be increased (e.g., on each key press) or decreased (e.g., only in response to submitting data explicitly). Further, the types of data are not limited to those provided in the above examples and any content that can be captured by a web application or mobile/native application may be collected. Notably, as will be discussed, the agent emulator allows an agent to monitor the user's progress and provide assistance to the user during the co-browsing session.

In step 508, the method can include determining if the user navigates to any other pages in the co-browsing application. If so, the method proceeds to step 510 and can coordinate the page change with other emulators. In some implementations, the co-browsing application can transmit a page change event (similar to data input events) that indicates that the co-browsing application has changed pages. For example, the co-browsing application can transmit a page identifier, URL, URI, or similar type of identifier. In some implementations, each emulator can store pages locally and thus can quickly render a given page based on the page identifier and any session-specific data. For example, in FIG. 7, when a user navigates to page 704 (e.g., by selecting "confirm payment"), the co-browsing application can fire an event transmitting data (e.g. JSON data) such as:

```
{
    "event": "page change",
    "target": "term_review"
}
```

Here, the "target" parameter can be used by emulator to load the DOM corresponding to page 704 and render the page. In some implementations, the event for a page change can include user-specific or session-specific data. In these implementations, the emulators could "re-hydrate" the DOM by inserting the user-specific or session-specific data, as will be discussed.

As illustrated in the loop of FIG. 5, the process (step 502 through step 510) can be repeated multiple times as a user using the co-browsing application navigates through one or more pages. Further, in some implementations, the agent application or emulator can cause the co-browsing application to navigate to a specific page in step 502. Once the user has accessed all desired pages, the user can end the process. For example, the user can select a "complete" button or control or the agent can terminate the session. In response, the method proceeds to step 512.

In step 512, the method can include transmitting all collected data to the agent application. As discussed in FIG. 1, the agent application may comprise an application that allows an agent to interact with a backend system. In some implementations, the co-browsing application may periodically transmit collected data to the agent application via the backend system while in others (such as that in step 512), the method can transmit all data at once. In general, when transmitting event data to the emulators, the backend system need not be updated and the update can occur at once in step 512 wherein the co-browsing application transmit all the collected data (e.g., order information, service details, etc.). The specific operations performed after step 512 are not limited and any operations using such data may be envisioned.

As illustrated, a lightweight page-based approach to synchronization is used to share a co-browsing session between an agent, a user, and optionally one or more authorized users. Combined with a voice or chat session, agents can be more informed about a user's progress through a workflow and can more easily assist the user during the session. Such an approach can aid all parties, preventing unnecessary errors and processing time to address such errors, improving the overall reliability of the communications system.

Figure 6:
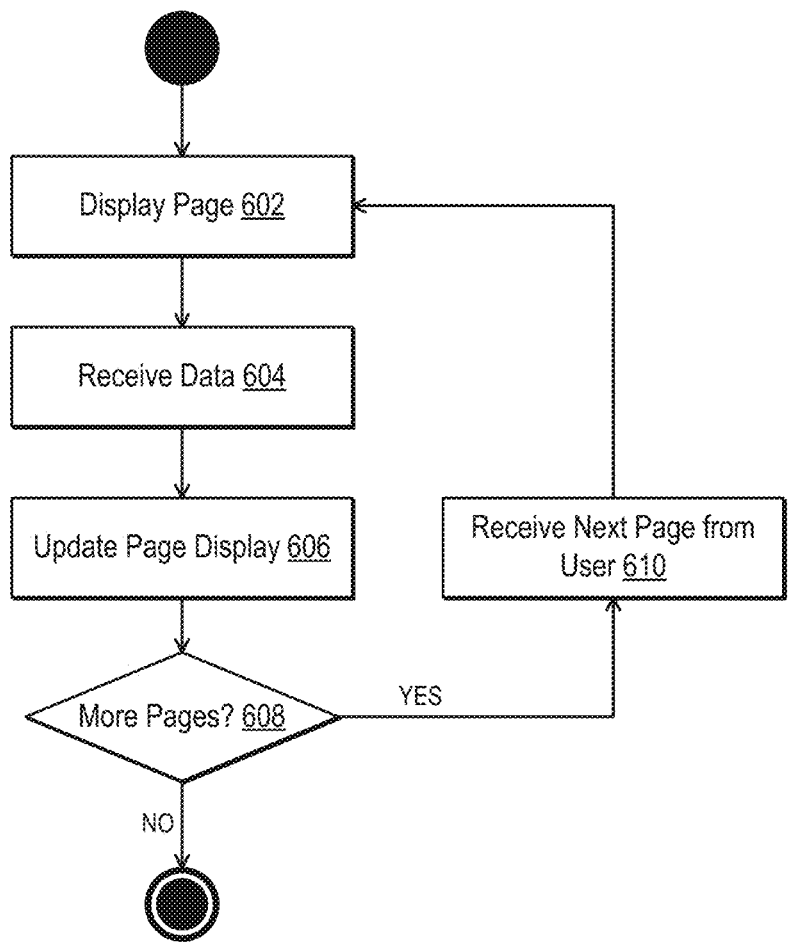
FIG. 6 is a flow diagram illustrating a method for synchronizing co-browsing at an agent device.

FIG. 6 is a flow diagram illustrating a method for synchronizing co-browsing at an agent device. In some implementations, the method of FIG. 6 may be executed via an emulator application running on an agent device associated with the communication session initiated in FIG. 2. Alternatively, or in conjunction with the foregoing, the method of FIG. 6 can also be executed by an authorized device.

In step 602, the method can include displaying a page by an agent emulator.

In some implementations, the page can comprise a web page or a page of a mobile or native application. In some implementations, the page can include static content. Alternatively, or in conjunction with the foregoing, the page can include interactive content such as hyperlinks, form fields, signature inputs, or any other type of control that can receive user input or data. In some implementations, the page can be structured as a document object model (DOM) or similar type of structured representation of the page. In some implementations, the first page displayed by the agent emulator (and co-browsing application, as described in FIG. 5) can be selected based on the user intent, based on a page selected by the agent, or based on the user's progress through a series of pages. The specific content of the page is not limiting. Specific details on rendering a page are not described herein but described elsewhere.

In step 604, the method can include receiving data entered by a user via a co-browsing application that is displaying the same page in synchrony. As discussed in connection with step 506, the co-browsing application may record user interactions (e.g., form inputs, mouse clicks, touch events) and report data such as entered text, interactions, etc. to the agent emulator via, for example, a message queue. Specific details on the form of such events were described more fully in FIG. 5 and that description is not repeated herein.

In step 606, the method can include updating a display of the page at the agent emulator based on the data received in step 604. In some implementations, the agent emulator can include receiving code that can receive events from the co-browsing application in forms similar to those described in FIG. 5. In response, this code can extract the event detail, identify portions of page to update, and correspondingly update the page to display data representing the events. For example, consider the event data structure described previously:

```
{
    "form_state": {
        "agreements": [
            { name: "subscriber", "accepted": true },
            { name: "privacy", "accepted": true },
        ],
        "signature": <<blob>>
    }
}
```

In this scenario, the agent emulator may store a mapping of the "agreements" and "signature" properties to DOM elements in the current page. Then, the agent emulator can access the DOM and update the elements based on the event data (e.g., by selecting checkboxes or inserting the BLOB into an element).

In some implementations, the event data structure can include data describing where content should be updated. For example, the signature property can be expanded as:

```
{
    ...
    "signature": {
        "content": <<blob>>,
        "type": "replace",
        "element": "#signature_field"
    }
}
```

Here, the "element" property can allow the emulator to replace (e.g., based on the "type" parameter) the content of the element with the value of the "content" property:

const i=document.createElement('img')
i.src=signature.content;
const t=document.querySelector(signature.element)
t.appendChild(i)

In this example, the agent emulator creates an image based on the content parameter (e.g., a Base 64 encoded image) and identifies the target element to append the image to, thus synchronizing the signature insertion from the co-browsing application with the agent emulator. Certainly, other types of DOM manipulation may also be used and the disclosure is not limited to the example above.

In step 608, the method can include determining if more pages are to be displayed. If so, the method proceeds to step 610 where the agent emulator receives an identifier of a next page from the user via the co-browsing application and the process repeats. If not, the method ends. As discussed above, the co-browsing application can trigger a page change and transmit an identifier of the page to the agent emulator, which repeats the above process for each page until the co-browsing session ends. In some implementations, the agent emulator can also trigger page change which causes the co-browsing application to navigate to a new page, triggering the process as well.

Figure 8A:
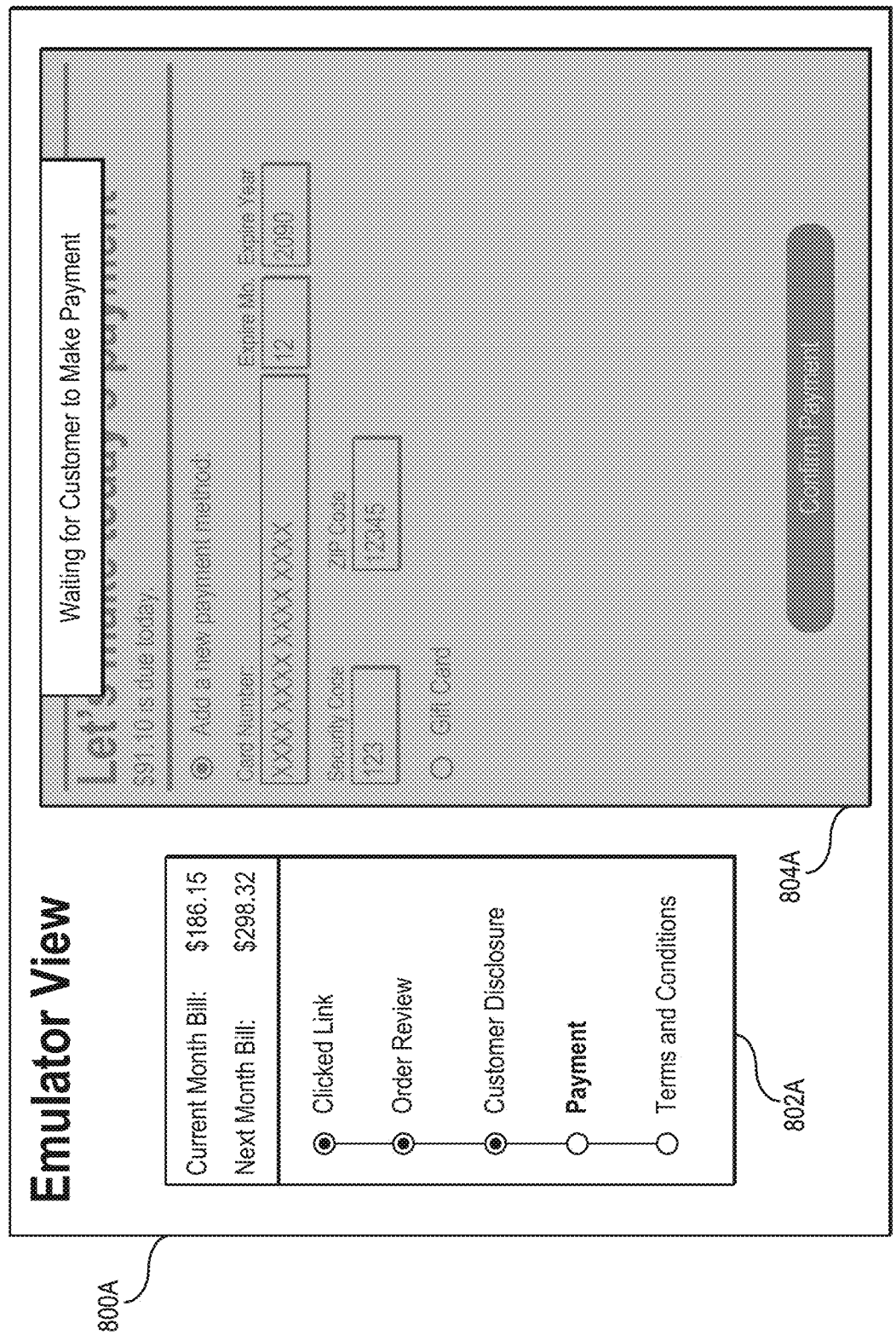
FIGS. 8A and 8B are user interface diagrams illustrating a co-browsing emulator application on an agent device.
Figure 8B:

FIG. 7 is a user interface diagram illustrating a co-browsing application of a client device. FIGS. 8A and 8B are user interface diagrams illustrating a co-browsing emulator application on an agent device.

As illustrated, FIG. 7 show two example pages (page 702 and page 704). In page 702, a co-browsing application displays a payment page that allows a user to select a payment type (e.g., "add a new payment method") and enter in sensitive data (i.e., credit card information). As discussed in FIG. 5, as the user types, changes field focus, or hits "Confirm Payment," the data entered can be transmitted to an agent emulator using a message queue as well as to other authorized users via separate queues. In the illustrated example, the co-browsing application may shield or otherwise protect the entered data when transmitting the data to an emulator but may otherwise transmit the unshielded data to the agent application or backend system.

Page 800A illustrates the agent emulator view corresponding to page 702. Here, the page 800A may be part of the agent application and agent emulator 804A may comprise the agent emulator. The page 800A includes a roadmap 802A that identifies the various pages in the co-browsing session. As illustrated, some pages have been visited in synchronization (e.g., "order review," "customer disclosure") while others have not yet been rendered ("terms and conditions").

The agent emulator 804A is synchronized with page 702 and displays a similar page to page 704. As illustrated, the presentation of the page in agent emulator 804A is slightly different (e.g., headings are full width etc.) due to the different characteristics of the page 800A, however, the content is similar. Notably, the agent emulator 804A has populated the fields in the page using data entered by the co-browsing application. However, as discussed, "card number" field was shielded before being sent to the agent emulator 804A and thus appears as 'X' values. In some implementations, the agent emulator 804A can dim or otherwise change the appearance of the page while awaiting further action, as illustrated. Further, the agent emulator 804A can provide informational notices regarding the workflow (e.g., "waiting for customer to make payment") to aid the agent.

Returning to FIG. 7, when a user selects the "confirm payment" button in page 702, the co-browsing application may transmit the credit card details to a payment server of the backend system for payment. Further, the co-browsing application may transmit a page change event to the agent emulator. The co-browsing application can then transition the user to page 704 which displays various form elements and input elements in which the user can select the form elements and provide a signature. Upon receiving interactions, the co-browsing application can transmit the selection of the checkboxes and the input of a signature to the agent emulator. As illustrated in page 800B, the agent application can update the roadmap 802B to reflect the user's page change. Further, the agent emulator 804B is updated to display the terms and conditions page. As illustrated, the interactions of the user are reflected in the recreation of the page within the agent emulator 804B.

Figure 9:
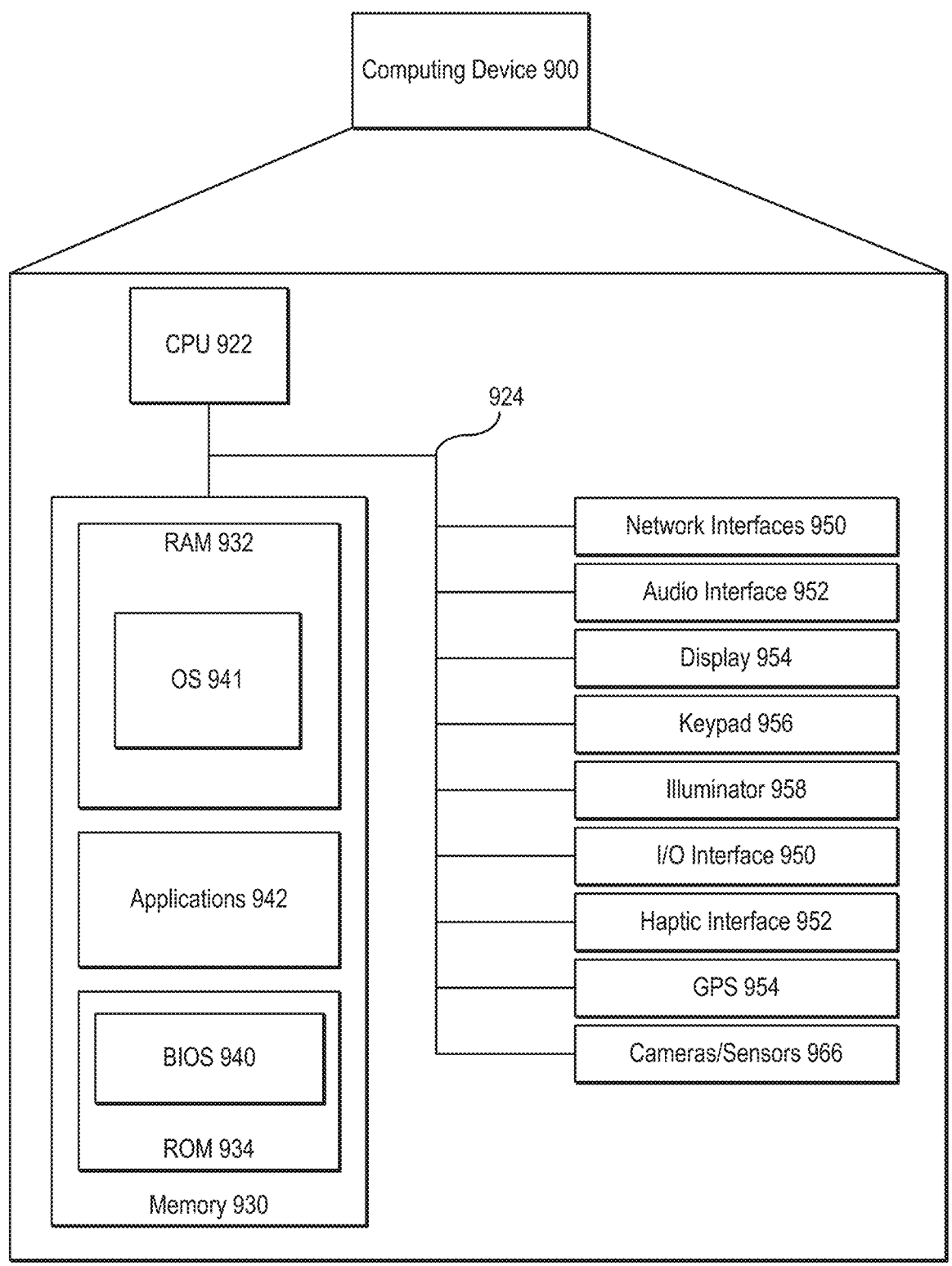
FIG. 9 is a block diagram illustrating a computing device showing an example of a client or server device used in the various embodiments of the disclosure.

FIG. 9 is a block diagram illustrating a computing device showing an example of a client or server device used in the various embodiments of the disclosure.

The computing device 900 can include more or fewer components than those shown in FIG. 9, depending on the deployment or usage of the computing device 900. For example, a server computing device, such as a rack-mounted server, may not include audio interfaces 952, displays 954, keypads 956, illuminators 958, haptic interfaces 962, Global Positioning Service (GPS) receivers 964, or cameras/sensors 966. Some devices can include additional components not shown, such as graphics processing unit (GPU) devices, cryptographic co-processors, artificial intelligence (AI) accelerators, or other peripheral devices.

As shown in the figure, computing device 900 includes a central processing unit (CPU 922) in communication with a mass memory 930 via a bus 924. The computing device 900 also includes network interfaces 950, an audio interface 952, a display 954, a keypad 956, an illuminator 958, an input/output interface 960, a haptic interface 962, an optional global positioning systems (GPS) receiver 964 and a camera(s) or other optical, thermal, or electromagnetic sensors 966. Computing device 900 can include one camera/sensor 966 or a plurality of cameras/sensor 966. The positioning of the camera(s)/sensor(s) 966 on the computing device 900 can change per computing device 900 model, per computing device 900 capabilities, and the like, or some combination thereof.

In some embodiments, the CPU 922 can comprise a general-purpose CPU. The CPU 922 can comprise a single-core or multiple-core CPU. The CPU 922 can comprise a system-on-A-chip (SoC) or a similar embedded system. In some embodiments, a GPU can be used in place of, or in combination with, a CPU 922. Mass memory 930 can comprise a dynamic random-access memory (DRAM) device, a static random-access memory device (SRAM), or a Flash (e.g., NAND Flash) memory device. In some embodiments, mass memory 930 can comprise a combination of such memory types. In one embodiment, the bus 924 can comprise a Peripheral Component Interconnect Express (PCIe) bus. In some embodiments, the bus 924 can comprise multiple buses instead of a single bus.

Mass memory 930 illustrates another example of computer storage media for the storage of information such as computer-readable instructions, data structures, program modules, or other data. Mass memory 930 stores a basic input/output system ("BIOS") 940 for controlling the low-level operation of the computing device 900. In the illustrated embodiment, the BIOS 940 may be stored in a read-only memory (ROM) such as ROM 934. The mass memory also stores an operating system 941 for controlling the operation of the computing device 900.

Applications 942 can include computer-executable instructions which, when executed by the computing device 900, perform any of the methods (or portions of the methods) described previously in the description of the preceding figures. In some embodiments, the software or programs implementing the method embodiments can be read from a hard disk drive (not illustrated) and temporarily stored in RAM 932 by CPU 922. CPU 922 can then read the software or data from RAM 932, process them, and store them in RAM 932 again.

The computing device 900 can optionally communicate with a base station (not shown) or directly with another computing device. Network interface 950 is sometimes known as a transceiver, transceiving device, or network interface card (NIC).

The audio interface 952 produces and receives audio signals such as the sound of a human voice. For example, the audio interface 952 can be coupled to a speaker and microphone (not shown) to enable telecommunication with others or generate an audio acknowledgment for some action. Display 954 can be a liquid crystal display (LCD), gas plasma, light-emitting diode (LED), or any other type of display used with a computing device. Display 954 can also include a touch-sensitive screen arranged to receive input from an object such as a stylus or a digit from a human hand.

Keypad 956 can comprise any input device arranged to receive input from a user. Illuminator 958 can provide a status indication or provide light.

The computing device 900 also comprises an input/output interface 960 for communicating with external devices, using communication technologies, such as USB, infrared, Bluetooth®, or the like. The haptic interface 962 provides tactile feedback to a user of the client device.

The optional GPS receiver 964 can determine the physical coordinates of the computing device 900 on the surface of the Earth, which typically outputs a location as latitude and longitude values. GPS receiver 964 can also employ other geo-positioning mechanisms, including, but not limited to, triangulation, assisted GPS (AGPS), E-OTD, CI, SAI, ETA, BSS, or the like, to further determine the physical location of the computing device 900 on the surface of the Earth. In one embodiment, however, the computing device 900 can communicate through other components, providing other information that can be employed to determine the physical location of the device, including, for example, a MAC address, IP address, or the like.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to the desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product or software that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as read-only memory ("ROM"), random access memory ("RAM"), magnetic disk storage media, optical storage media, flash memory components, etc.

In this description, various functions and operations are described as being performed by or caused by computer instructions to simplify the description. However, those skilled in the art will recognize what is meant by such expressions is that the functions result from the execution of the computer instructions by one or more controllers or processors, such as a microprocessor. Alternatively, or in combination, the functions and operations can be implemented using special-purpose circuitry, with or without software instructions, such as using Application-Specific Integrated Circuit (ASIC) or Field-Programmable Gate Array (FPGA). Embodiments can be implemented using hardwired circuitry without software instructions or in combination with software instructions. Thus, the techniques are limited neither to any specific combination of hardware circuitry and software nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

We claim:

1. A method comprising:
   initiating a communication session between a user and an agent;
   generating an application link for the communication session, the application link associated with a co-browsing application;
   transmitting the application link to a client device associated with the user;
   receiving data from the client device via the co-browsing application executed in response to the application link and associating the data with the communication session;
   pre-populating a co-browsing session using the data; and
   synchronizing a display of pages between an agent emulator and the co-browsing application, wherein synchronizing includes rendering a given page on both the agent emulator and the co-browsing application and displaying an input received via the co-browsing application in the agent emulator, wherein the agent emulator comprises a lightweight page rendering application that maintains a document object model (DOM) representation of pages synchronized with the co-browsing application.

2. The method of claim 1, wherein synchronizing a display of pages between an agent emulator and the co-browsing application comprises synchronizing the input via a message queues communicatively coupling the agent emulator and the co-browsing application.

3. The method of claim 1, wherein generating the application link comprises customizing the application link based on one of a profile of the user or a determined intent of the communication session.

4. The method of claim 1, wherein generating the application link comprises determining that an estimated hold time of the communication session exceeds a preconfigured threshold.

5. The method of claim 1, wherein synchronizing the display of pages between the agent emulator and the co-browsing application comprises:
   displaying the given page in the co-browsing application;
   displaying the given page in the agent emulator;
   detecting, by the co-browsing application, user input to the given page;
   receiving, by the agent emulator, the user input; and
   updating the given page on the agent emulator based on the user input.

6. The method of claim 5, wherein the co-browsing application is further configured to replace at least a portion of the user input with shielded data prior to transmitting the user input to the agent emulator.

7. The method of claim 5, further comprising receiving a page change event from the co-browsing application and displaying a second given page in the agent emulator responsive to the page change event.

8. A system comprising:
   a processor configured to:
      initiate a communication session between a user and an agent;
      generate an application link for the communication session, the application link associated with a co-browsing application;
      transmit the application link to a client device associated with the user;
      receive data from the client device via the co-browsing application executed in response to the application link and associating the data with the communication session;
      pre-populate a co-browsing session using the data; and
      synchronize a display of pages between an agent emulator and the co-browsing application, wherein synchronizing includes rendering a given page on both the agent emulator and the co-browsing application and displaying an input received via the co-browsing application in the agent emulator, wherein the agent emulator comprises a lightweight page rendering application that maintains a document object model (DOM) representation of pages synchronized with the co-browsing application.

9. The system of claim 8, wherein synchronizing a display of pages between an agent emulator and the co-browsing application comprises synchronizing the input via a message queues communicatively coupling the agent emulator and the co-browsing application.

10. The system of claim 8, wherein generating the application link comprises customizing the application link based on one of a profile of the user or a determined intent of the communication session.

11. The system of claim 8, wherein generating the application link comprises determining that an estimated hold time of the communication session exceeds a preconfigured threshold.

12. The system of claim 8, wherein synchronizing the display of pages between the agent emulator and the co-browsing application comprises:
    displaying the given page in the co-browsing application;
    displaying the given page in the agent emulator;
    detecting, by the co-browsing application, user input to the given page;
    receiving, by the agent emulator, the user input; and
    updating the given page on the agent emulator based on the user input.

13. The system of claim 12, wherein the co-browsing application is further configured to replace at least a portion of the user input with shielded data prior to transmitting the user input to the agent emulator.

14. The system of claim 12, the processor further configured to receive a page change event from the co-browsing application and displaying a second given page in the agent emulator responsive to the page change event.

15. A non-transitory computer-readable storage medium for tangibly storing computer program instructions capable of being executed by a computer processor, the computer program instructions defining steps of:
    initiating a communication session between a user and an agent;
    generating an application link for the communication session, the application link associated with a co-browsing application;

transmitting the application link to a client device associated with the user;

receiving data from the client device via the co-browsing application executed in response to the application link and associating the data with the communication session;

pre-populating a co-browsing session using the data; and synchronizing a display of pages between an agent emulator and the co-browsing application, wherein synchronizing includes rendering a given page on both the agent emulator and the co-browsing application and displaying an input received via the co-browsing application in the agent emulator, wherein the agent emulator comprises a lightweight page rendering application that maintains a document object model (DOM) representation of pages synchronized with the co-browsing application.

16. The non-transitory computer-readable storage medium of claim 15, wherein synchronizing a display of pages between an agent emulator and the co-browsing application comprises synchronizing the input via a message queues communicatively coupling the agent emulator and the co-browsing application.

17. The non-transitory computer-readable storage medium of claim 15, wherein generating the application link comprises customizing the application link based on one of a profile of the user or a determined intent of the communication session.

18. The non-transitory computer-readable storage medium of claim 15, wherein generating the application link comprises determining that an estimated hold time of the communication session exceeds a preconfigured threshold.

19. The non-transitory computer-readable storage medium of claim 15, wherein synchronizing the display of pages between the agent emulator and the co-browsing application comprises:
- displaying the given page in the co-browsing application;
- displaying the given page in the agent emulator;
- detecting, by the co-browsing application, user input to the given page;
- receiving, by the agent emulator, the user input; and
- updating the given page on the agent emulator based on the user input.

20. The non-transitory computer-readable storage medium of claim 19, wherein the co-browsing application is further configured to replace at least a portion of the user input with shielded data prior to transmitting the user input to the agent emulator.

* * * * *